(12) United States Patent
Saint Macary et al.

(10) Patent No.: US 9,020,290 B2
(45) Date of Patent: Apr. 28, 2015

(54) REDUCE EXTRAPOLATE

(71) Applicant: Microsoft Corporation, Redmond, WA (US)

(72) Inventors: Damien Saint Macary, Redmond, WA (US); Sridhar Sankuratri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 13/754,003

(22) Filed: Jan. 30, 2013

(65) Prior Publication Data

US 2014/0212059 A1    Jul. 31, 2014

(51) Int. Cl.

| | |
|---|---|
| G06K 9/36 | (2006.01) |
| G06T 9/00 | (2006.01) |
| G06T 5/00 | (2006.01) |
| H04N 19/176 | (2014.01) |
| H04N 19/117 | (2014.01) |
| H04N 19/86 | (2014.01) |
| H04N 19/63 | (2014.01) |

(52) U.S. Cl.
CPC .................. *G06T 9/007* (2013.01); *G06T 5/002* (2013.01); *H04N 19/176* (2014.11); *H04N 19/63* (2014.11); *H04N 19/117* (2014.11); *H04N 19/86* (2014.11)

(58) Field of Classification Search
USPC ................................................. 382/248, 240
See application file for complete search history.

(56) References Cited

U.S. PATENT DOCUMENTS

| | | | |
|---|---|---|---|
| 6,049,630 | A | 4/2000 | Wang et al. |
| 6,505,517 | B1 | 1/2003 | Eryurek et al. |
| 6,603,814 | B2 | 8/2003 | Clark et al. |
| 6,710,819 | B2 | 3/2004 | Swan |
| 6,801,573 | B2 | 10/2004 | Zheng |
| 6,934,420 | B1 | 8/2005 | Hsu et al. |
| 7,302,104 | B2 * | 11/2007 | Suino ............................ 382/240 |
| 7,418,144 | B2 * | 8/2008 | Wang et al. ................... 382/240 |

OTHER PUBLICATIONS

"International Search Report & Written Opinion for PCT Application No. PCT/US2014/012413", Mailed Date: May 19, 2014, Filed Date: Jan. 22, 2014, 11 Pages.

Kharitonenko, et al., "A Wavelet Transform with Point-Symmetric Extension at Tile Boundaries", In IEEE Transaction on Image Processing, vol. 11, Issue 12, Dec. 2002, pp. 1357-1364.

Karlsson, et al., "Extension of Finite Length Signals for Sub-Band Coding", In Journal of Signal Processing, vol. 17, Issue 2, Jun. 1989, pp. 161-168.

(Continued)

*Primary Examiner* — Yon Couso
(74) *Attorney, Agent, or Firm* — Kate Drakos; Micky Minhas

(57) ABSTRACT

A method for removing boundary distortion includes receiving a one-dimensional input signal and determining whether the one-dimensional input signal includes an even number of data elements. If the one-dimensional input signal includes an even number of data elements, an extrapolation operation is performed on one of a first or second boundary of the one-dimensional input signal. The extrapolation operation produces one additional data element. The method may further include performing a mirroring operation on the signal data resulting from the extrapolation operation to produce a mirrored signal, and performing a transform operation the mirrored signal.

20 Claims, 12 Drawing Sheets

(56) References Cited

OTHER PUBLICATIONS

Cerna, et al., "Boundary Artifact Reduction in Wavelet Image Compression", Published on: Jan. 2009, Available at: http://dsp.vscht.cz/konference_matlab/MATLAB09/prispevky/019_cerna.pdf, 11 pgs.

Wang, et al., "GOP-Boundary Artifact Reduction Using a New Extension and Sub-Sampling Method for Wavelet-Based Video Coding", In Picture Coding Symposium, Apr. 24, 2006, pp. 1-6.

Asamwar et al., "Interpolation of Images Using Discrete Wavelet Transform to Simulate Image Resizing as in Human Vision", International Journal of Automation and Computing, Feb. 2010, pp. 9-16, vol. 7, No. 1.

Williams et al., "A Discrete Wavelet Transform Without Edge Effects Using Wavelet Extrapolation", Journal of Fourier Analysis and Applications, Jan. 28, 1995, pp. 1-19, vol. 3, No. 4.

PCT Written Opinion of the International Examining Authority in International Application PCT/US2014/012413, mailed Oct. 10, 2014, 5 pgs.

* cited by examiner

REDUCE EXTRAPOLATE

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource. In the remote desktop environment, data representing graphics to be transmitted to the client are typically compressed by the server, transmitted from the server to the client through a network, and decompressed by the client and displayed on the local user display. Various schemes may be used to minimize the size of the graphics data that needs to be transmitted. One such scheme may include dividing the graphics data into tiles. These tiles are encoded, transmitted and decoded. During this process, edge-of-tile artifacts that are often visible with a conventional tiling approach where each tile is individually compressed and decompressed. These artifacts tend to limit the amount of compression that can be realized for a given decoded image quality, and thus may have a direct effect on the transmitted image and negatively impact the remote user's experience.

SUMMARY

This summary is provided to introduce a selection of concepts in a simplified form that are further described below in the Detailed Description section. This summary is not intended to identify key features or essential features of the disclosure subject matter, nor is it intended to be used as an aid in determining the scope of the disclosure.

Embodiments herein provide systems and methods for improving boundary regions of encoded tiles. A method may include receiving a plurality of tile coefficients, processing the coefficients to produce a high frequency result set and a low frequency result set, and introducing an additional low frequency tile coefficient to a boundary between two adjacent tiles by extrapolating a low frequency coefficient from the last two received coefficients of a first tile.

An image compression method capable of removing boundary distortion is described. The method may include receiving a one-dimensional input signal, determining whether the one-dimensional input signal includes an even number of data elements, if the one-dimensional input signal includes an even number of data elements, performing an extrapolation operation on one of a first or second boundary of the one-dimensional input signal, wherein the extrapolation operation produces one additional data element, performing a mirroring operation on the signal data resulting from the extrapolation operation to produce a mirrored signal, and performing a transform operation the mirrored signal.

A computer-readable medium comprising executable instructions that, when executed by a processor, remove boundary distortion is also disclosed. The computer-readable medium includes instructions executable by the processor for: receiving a one-dimensional input signal, determining whether the one-dimensional input signal includes an even number of data elements, if the one-dimensional input signal includes an even number of data elements, performing an extrapolation operation on one of a first or second boundary of the one-dimensional input signal, wherein the extrapolation operation produces one additional data element, performing a mirroring operation on the signal data resulting from the extrapolation operation to produce a mirrored signal, and performing a transform operation the mirrored signal.

A computer-readable medium comprising executable instructions that, when executed by a processor, remove boundary distortion is also disclosed. The computer-readable medium includes instructions executable by the processor for: receiving a one-dimensional input signal, determining whether the one-dimensional input signal includes an even number of data elements, if the one-dimensional input signal includes an even number of data elements, performing an extrapolation operation on one of a first or second boundary of the one-dimensional input signal, wherein the extrapolation operation produces one additional data element, performing a mirroring operation on the signal data resulting from the extrapolation operation to produce a mirrored signal, performing a transform operation the mirrored signal, receiving a second one-dimensional input signal, determining whether the second one-dimensional input signal includes an even number of data elements, if the second one-dimensional input signal includes an even number of data elements, performing a second extrapolation operation on one of a first or second boundary of the second one-dimensional input signal, wherein the second extrapolation operation produces one additional data element, performing a second mirroring operation on the signal data resulting from the second extrapolation operation to produce a second mirrored signal, and performing a transform operation the second mirrored signal.

BRIEF DESCRIPTION OF THE DRAWINGS

Referring now to the drawings in which like reference numbers represent corresponding parts throughout.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Embodiments are provided to reduce tile boundary distortion. Methods and systems providing improved bitmap image quality are disclosed. In the embodiments described herein, an entropy encoder may progressively encode processed bitmap data until a desired image quality is achieved.

Figure 1:
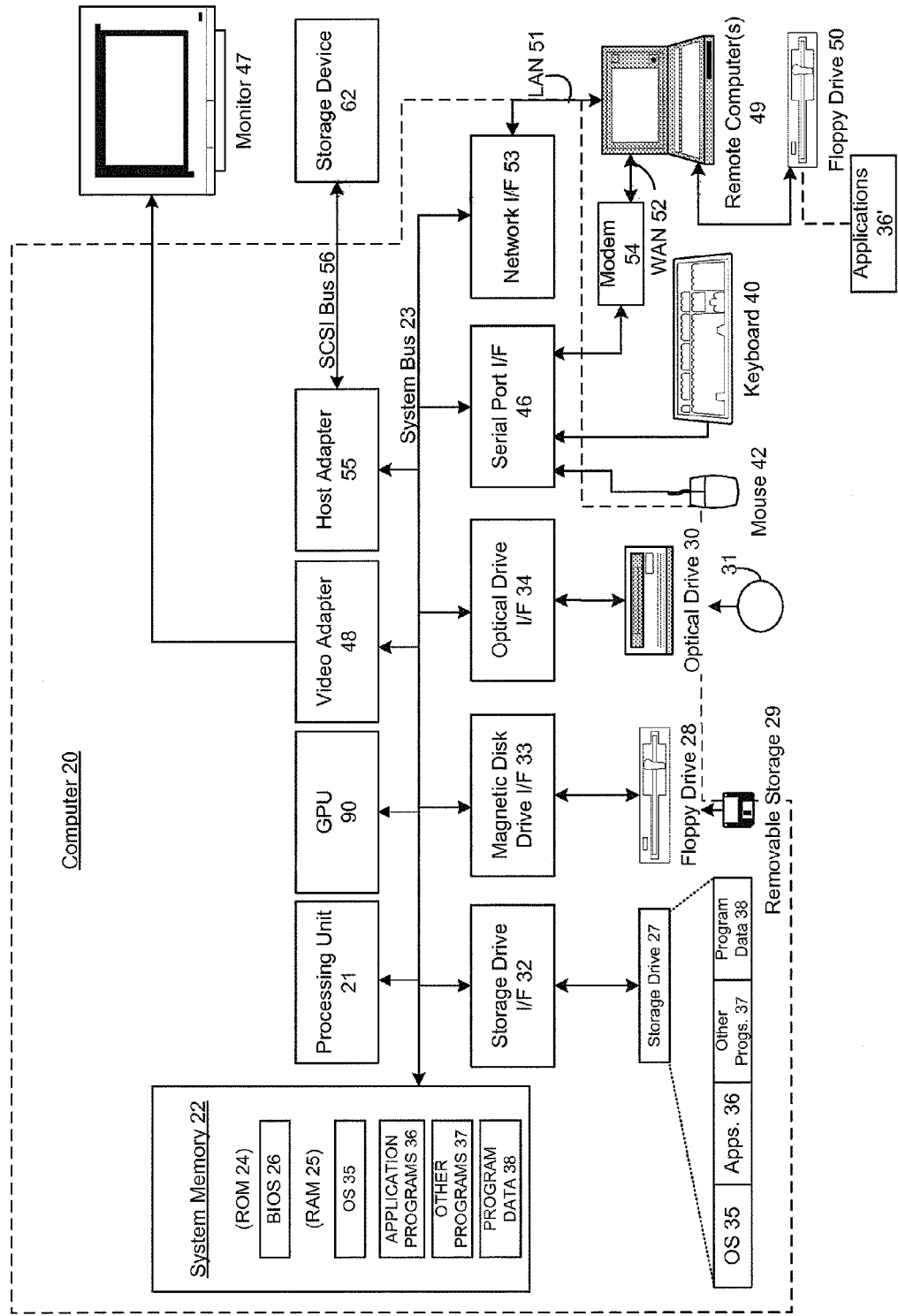
FIG. 1 illustrates the high level architecture of a system for providing reduced tile boundary distortion according to embodiments of the disclosure.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

The remote computer may be a remote desktop system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
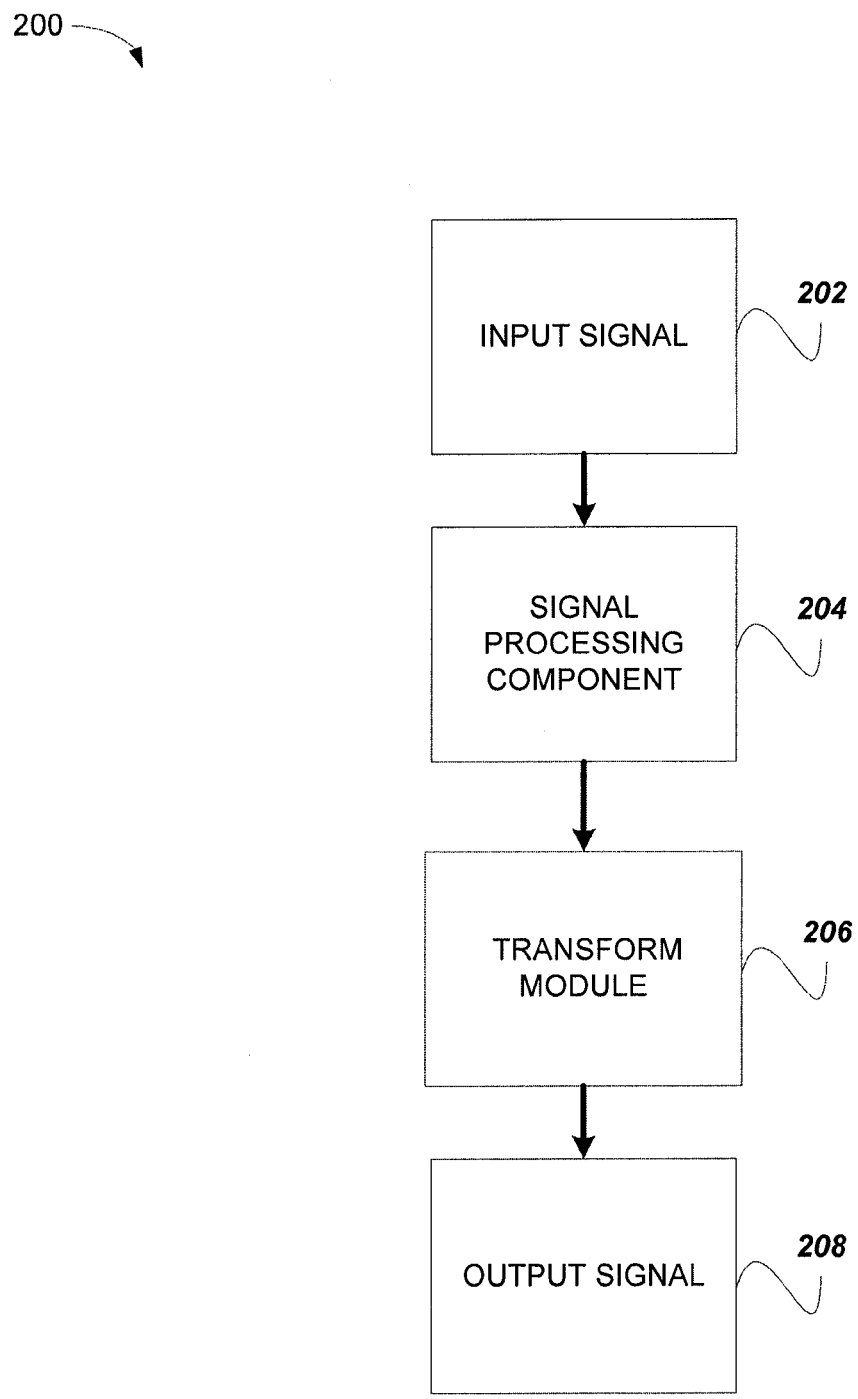
FIG. 2 is a diagram further illustrating a system for image processing including providing reduced tile boundary distortion according to embodiments of the disclosure.

FIG. 2 depicts a process flow 200 for processing input images, including providing reduced tile boundary distortion according to an embodiment of the disclosure. In embodiments, the process flow of FIG. 2 may be implemented as processor-executable instructions stored in memory 22 of FIG. 1, and executed by processor 21 to cause the process flow to occur. It may be appreciated that there are embodiments of the invention that do not implement all components depicted in FIG. 2, or that implement the components (or a subset thereof) in a different permutation than is depicted in FIG. 2.

An input signal 202 may be initially processed by signal processing component 204. The data of the input signal 202 processed by signal processing component 202 may be a frame of image data in a remote presentation session (sometimes referred to herein as "graphical data"). In some embodiments, image tiling and/or color conversion may be applied to the input image 202. With respect to tiling, in the compression process, an image of each color component may be divided into non-overlapping tiles of a rectangular form, and each of the tiles of each color component thus divided is subjected to compression. With respect to color conversion, each tile image of each color component may subjected to a color transformation process for the purpose of improving the of compression ratio. It should be noted that this color transformation process could be omitted. In that case, each component may be processed as it is. Further, in the case of a monochrome image, such a color transformation is unnecessary.

After initial processing, input image data may be further processed by, for example, the transform module 206. In discrete wavelet transformation, an image is typically filtered using high pass and low pass filters and the resulting image may comprise high-high, high-low, low-high, and low-low components. Such a process is described in further detail below. Each of these components may in turn be filtered to produce set of sub-bands. The process may be carried out three times resulting in ten different sub-bands. The sub-bands may be linearized, by, for example applying a linearizing function to the image to produce a linear image, encoded, and sent to a remote computer. For instance, a remote presentation server (not shown) that implements the process flow of FIG. 2 may take a sequence of frames (e.g. a display of a computer desktop over time), and process them for transmission to a client across a communications network. The remote computer may then take output signals 208 (e.g. a display of a computer desktop over time) output from the transform module 206, and process them for transmission to a client across a communications network.

Figure 3:
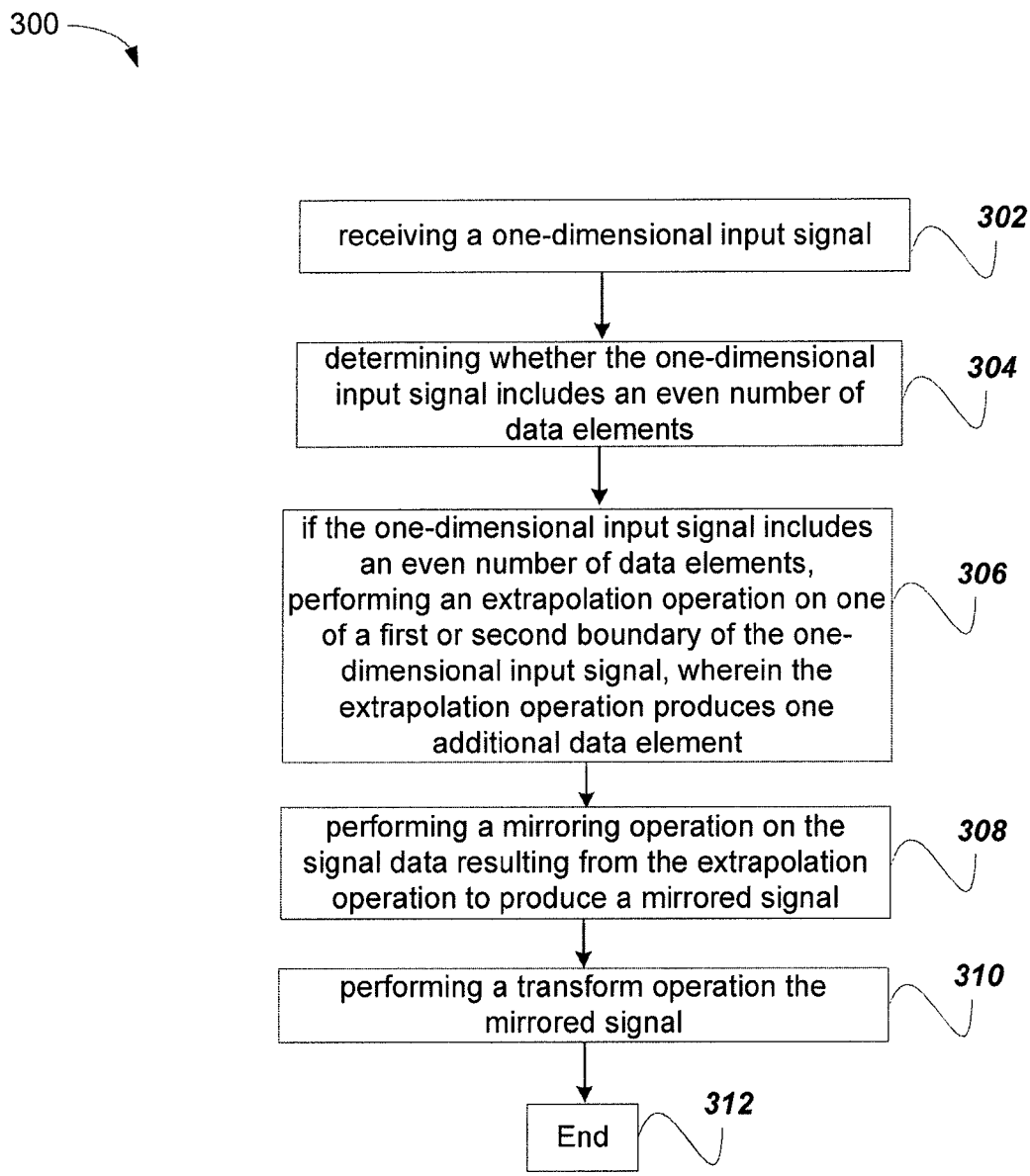
FIG. 3 illustrates a routine for providing reduced tile boundary distortion according to embodiments of the disclosure.

Turning now to FIG. 3, a flow diagram illustrating a routine 300 for reducing tile boundary distortion, in accordance with various embodiments, will now be described. In some embodiments, the routine 300 may be implemented via the system components and/or applications described above with respect to FIGS. 1-2 (e.g., transform module 206 of FIG. 2). Further examples of the systems and methods described herein are also provided in FIGS. 4-7. Additional or alternative embodiments using components other than those described herein are also contemplated.

The routine 300 begins at operation 302, where an input signal is received. In some embodiments, the signal is a one-dimensional input signal representative of an audio, video or image component. For instance, a signal representing a row or column of an input image may be received. The signal may be received from, for instance, signal processing component 204. As described above, signal processing component 204 may first perform a color conversion on an input signal 202 (in the instance where the input signal represents an image or video component). For instance, the input signal 202 may then be represented, as a tile including one or more rows and columns of image data (e.g., a 64×64 pixel tile).

Thus, operations 302-310 may first be performed on a received one-dimensional signal representing a row and then on a received one-dimensional signal representing a column, or vice versa, until all signal data is processed.

From operation 302, the routine 300 continues to operation 304, where it is determined whether the one-dimensional input signal includes an even number of data elements or coefficients. In some instances, input image data may include an even number of data elements. For instance, performing a color conversion operation on raw image data may produce such an even number.

From operation 304, the routine 300 continues to operation 3064, where, if the one-dimensional input signal includes an even number of data elements, an extrapolation operation is performed on one of a first or second boundary of the one-dimensional input signal. The extrapolation operation may produce one additional data element. For instance, to prevent mirroring around a high frequency peripheral element, such as when the number of elements is even and a peripheral high frequency coefficient is received or produced, the transform module 206 may first extrapolate another element from the last two elements in the sequence. Thus, an additional input element may be produced by extrapolating an additional coefficient value for the input signal from a last two of the received or produced data elements. Extrapolation may be performed by any technique suitable for estimating, beyond an original observation interval (e.g., the input signal length), a value of an additional data element on the basis of a relationship between the additional data element and one or more other data elements (e.g., adjacent data elements). For example, in the case of a 64×64 pixel tile, a 65th coefficient may be introduced by extrapolating the last two input coefficients, $IC_{63}$ and $IC_{64}$. In such an embodiment, the 65th input coefficient may be derived from the equation:

$$IC_{65}=2IC_{64}-IC_{63}$$

where $IC_{65}$ represents the extrapolated additional data element, $IC_{64}$ represents the last coefficient that may be input into a transform operation (e.g., from input elements received from a color conversion), and $IC_{63}$ represents the second to last coefficient that may be input into the transform operation.

Figure 6:
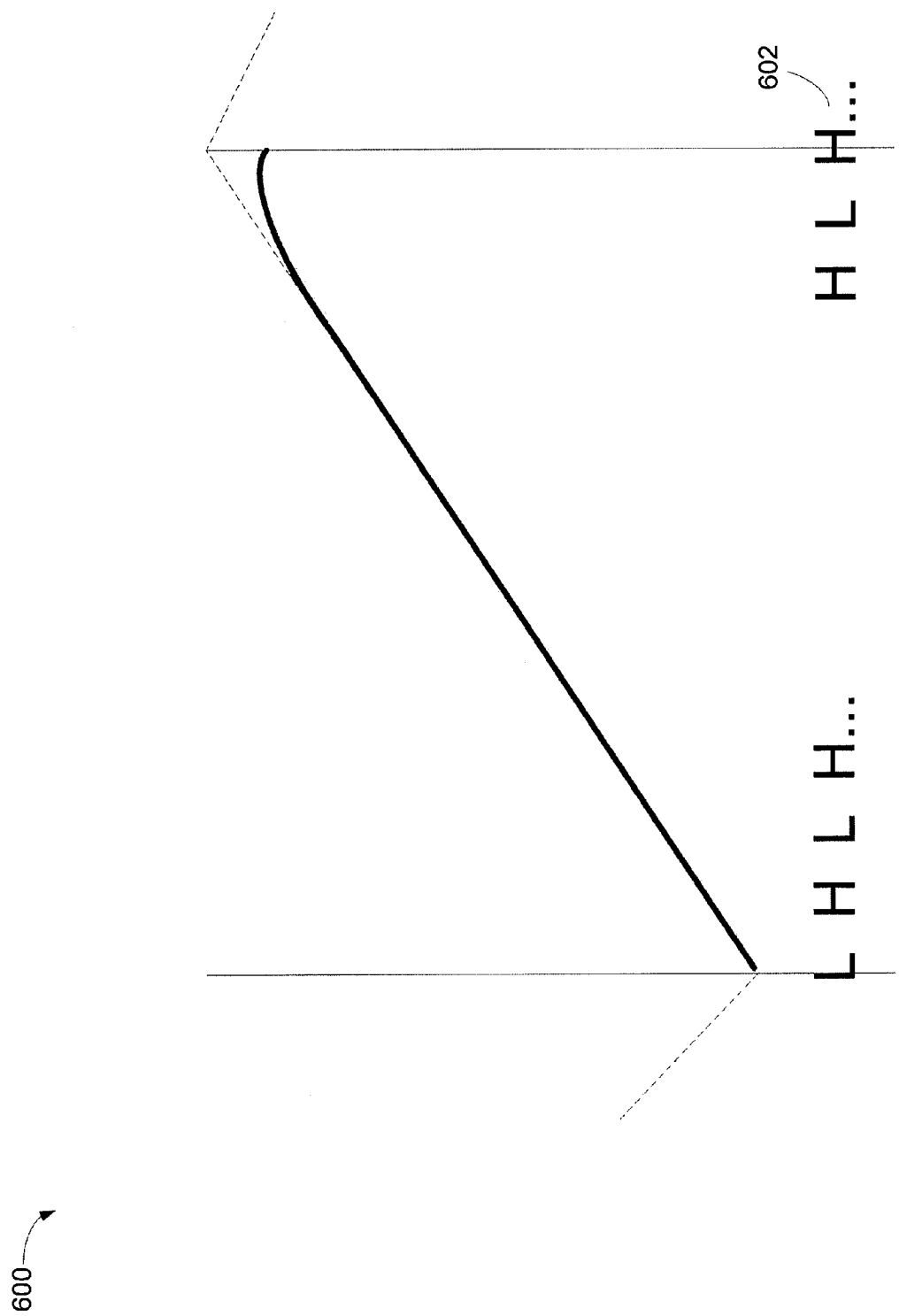
FIG. 6 is graphical representation illustrating a tile boundary before reducing tile boundary distortion according to embodiments of the disclosure.

From operation 306, the routine 300 continues to operation 308, where after the extrapolation operation is performed and a 65 coefficient is extrapolated, a mirroring operation may be performed on the signal data resulting from the extrapolation operation to produce a mirrored signal. During a typical transform operation, in some instances, at the edge part or tile boundaries of the image, there may not exist an adjacent tile element with regard to the central tile element. In such instances, the deficient picture element value may be supplemented by a process called "mirroring." It should be noted that mirroring is an operation of folding the pixel values (or frequency coefficients, data elements of an input signal, etc.) in line-symmetry with regard to a boundary or peripheral edge and uses the folded frequency coefficients as the frequency coefficients of the adjacent picture elements (e.g., frames or tiles). When a sequence of received inputs has an even number of elements and enters the low pass/high pass filter of the transform module 206, the result may be the generation of a high frequency peripheral element. Thus, an artificial high frequency element may be generated from the mirroring operation. Such an artificial high frequency element may produce undesired boundary distortion. FIG. 6 is a graphical representation 600 of an artificial high frequency element H 602 introduced after mirroring in a typical scenario. However, proceeding with the example above, to prevent an artificial high frequency mirrored element, an additional coefficient element (e.g., the $65^{th}$ coefficient element $IC_{65}$) mirroring around the first and the extrapolated element (e.g., the boundary elements) may be performed.

From operation 308, the routine 300 continues to operation 310, where a first transform operation is performed. First transform operation may be a first-level image transform operation performed, for example, by transform module 206 of FIG. 2. Transform operation may be performed on the received image data in both or either of the horizontal and vertical directions, depending on the original dimensions of the input data, including the extrapolated and mirrored low frequency element when applicable. An image transform is a transform that may be used to generate an array of coefficients that correspond to the frequencies present in the image. In the embodiments described herein, the transform is a discrete wavelet transform (DWT), which is a wavelet transform in which the wavelets are discretely (as opposed to continuously) sampled. A DWT may be configured to decompose individual data components (or coefficient elements) of a received signal (e.g., a row or column of a pixel tile of an image) into corresponding color sub-bands. In some embodiments, the transform operation is a 5/3 DWT operation. A DWT is commonly used to transform an image into a representation that is more easily compressed than the original representation, and then compress the post-transform representation of the image.

In step 308, a transform operation may first project the received image data, including the extrapolated data element and mirrored signal, into a plurality of different frequency sub-bands. For instance, the transform operation may be configured to produce two additional data signals from the transformed mirrored signal, including one low frequency data signal and one a high frequency data signal. The plurality of different frequency sub-bands may be obtained by decomposing the image into frequency sub-bands according to one or more decomposition levels. Performing a DWT operation on the mirrored signal may include performing a first low pass filtering operation and a first high pass filtering operation on the signal to obtain two additional signals (a high frequency data signal and a low frequency data signal) each including a plurality of coefficient elements. For instance, for a received one-dimensional signal (e.g., horizontal "row," or vertical "column" of a pixel array), the transform module 206 may receive an input of 64 coefficients and process the coefficients using a high pass and low pass filter. In some embodiments, to perform the first transform operation, a high-pass filtering may be applied first in the vertical direction (direction of Y-axis) with regard to central picture elements having odd Y coordinates (y=2i+1), and the coefficients e(2i+1) are obtained.

Figure 4A:
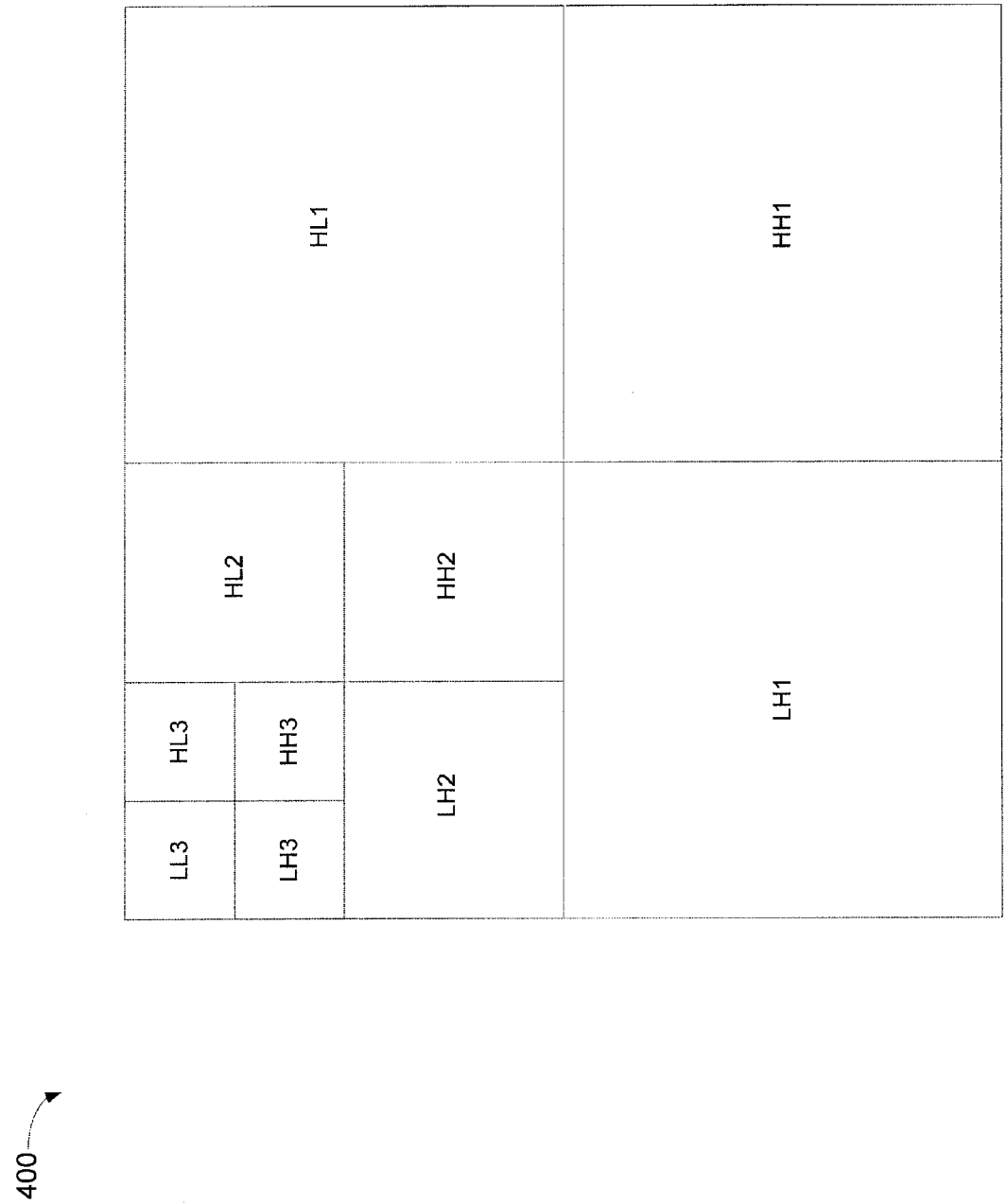
FIG. 4A is flow diagram illustrating a discrete wavelet transform configured for use in systems and methods for reducing tile boundary distortion according to embodiments of the disclosure.
Figure 4B:
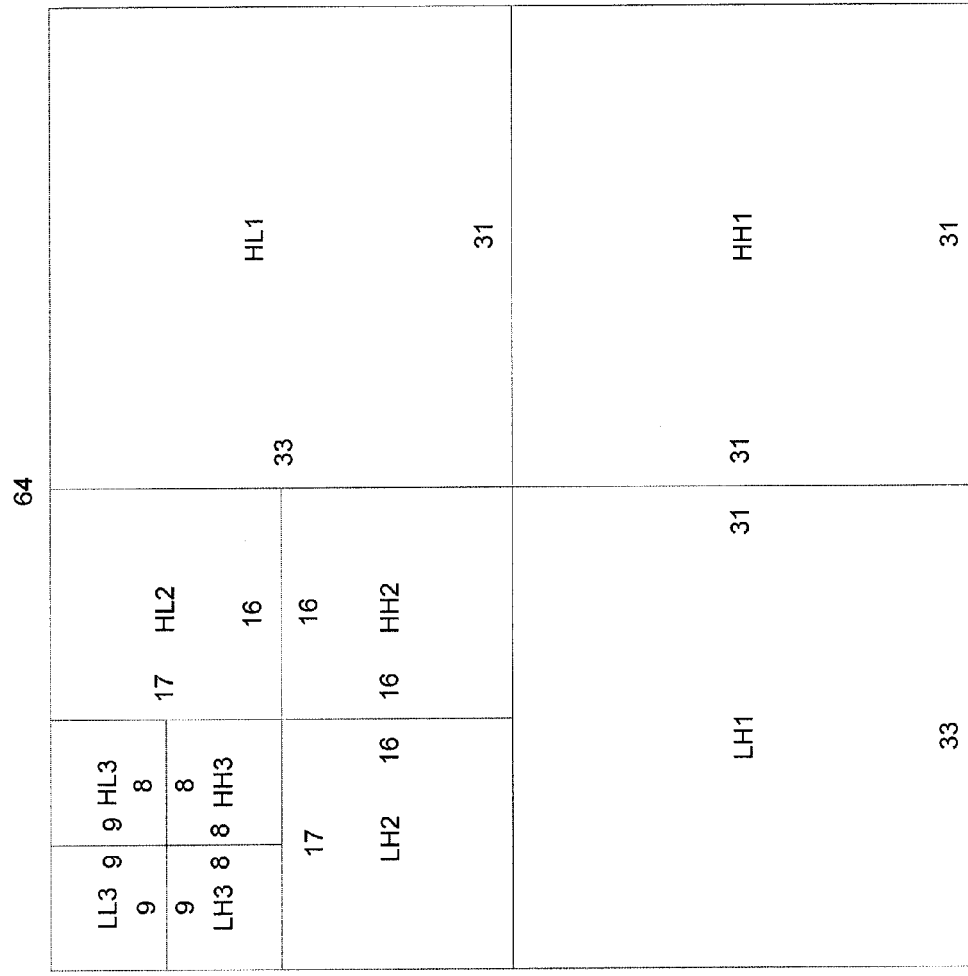
FIG. 4B is flow diagram illustrating a discrete wavelet transform configured for use in systems and methods for reducing tile boundary distortion according to embodiments of the disclosure.

After a single transform, received image data may be decomposed into four sub-bands of frequency coefficients, one corresponding to a first-level low pass sub-band, and three other first-level sub-bands corresponding to horizontal, vertical, and diagonal high pass sub-bands. In some embodiments, the coefficients obtained by the high-pass filtering may be represented as H coefficients, and the coefficients obtained by the low pass filtering may be represented as L coefficients. For instance, after a first pass an input signal 202 may be transformed to the array of the L coefficients and H coefficients shown in FIGS. 4A-4B as a result of a first transformation. Coefficients represented by the same symbol form a group may be called a sub-band. In the case of FIGS. 4A and 4B, there exist four sub-bands. The coefficients obtained by the low pass filtering about a central L coefficient may be designated as LL. The coefficients obtained by the high-pass filtering about a central L coefficient may be designated as HL. The coefficients obtained by the low pass filtering about a central H coefficient may be designated as LH, and the coefficients obtained by the high-pass filtering about a central H coefficient may be designated as HH. Generally, the decomposed image shows a coarse approximation image in the LL sub-band, and three detail images in higher sub-bands. FIG. 4A illustrates a DWT tile including four exemplary first pass frequency bands 502: LL3, LH3, HL3, HH3. Each first-level sub-band is a fourth of the size of the original image (i.e., 32×32 pixels in the instance that the original image was 64×64 pixels). High pass bands may be associated with image detail information, and low pass bands may be associated with scaling functions. It should be noted that any transform capable of transforming data in a scenario where input data comprises more low values than high values may be utilized.

After a first high pass, high pass results (excluding boundaries) may be represented as follows:

$$H_i = \text{HighPass}(e_{2i}, e_{2i+1}, e_{2i+2})$$

Input elements may be represented as e0, e1, e2 . . . , e62, e63 (for example, one horizontal row of a 64×64 tile for a given color component). Thus, a first high pass, H0, may produce high pass results e0, e1, e2, further depicted in FIG. 5 as 502.

Next, a low-pass filtering may be applied with regard to the central picture elements having even Y coordinate values (y=2i), and coefficients e(2i) are obtained. Low pass results (excluding boundaries) may be represented as follows:

$$L_i = \text{LowPass}(e_{2i-2}, e_{2i-1}, e_{2i}, e_{2i+1}, e_{2i+2})$$

Thus, a first low pass, L0, may produce low pass results e2, e1, e0, e1, and e2. L0 results are further depicted in FIG. 5 as results 504. The foregoing procedure may also be conducted for all the values of x. For instance, high-pass filtering may be applied to the array of the coefficients in the horizontal direction, where the high-pass filtering is applied with regard to the central coefficients having odd X coordinate values (x=2i+1), followed by a low-pass filtering applied with regard to the central picture elements having even X coordinate values (x=2i). As a result of the foregoing process, one wavelet transformation (one decomposition process) is completed.

Continuing the example above, by extrapolating the additional data element, during the transform operation a value for a first pass high frequency peripheral coefficient element is determined to be zero. Specifically, a value of zero may be derived for the final frequency result $H_{31}$ based on the extrapolation. For instance, the following calculation may be performed to obtain a zero value for $H_{31}$:

$$H_{31} = -1/4 IC_{63} + 1/2 IC_{64} - 1/2 IC_{65}$$

The extrapolated value may be substituted for $IC_{65}$, resulting in the equation:

$$H_{31} = -1/4 IC_{63} + 1/2 IC_{64} - 1/4 (2 IC_{64} - IC_{63}) = 0$$

Figure 5:
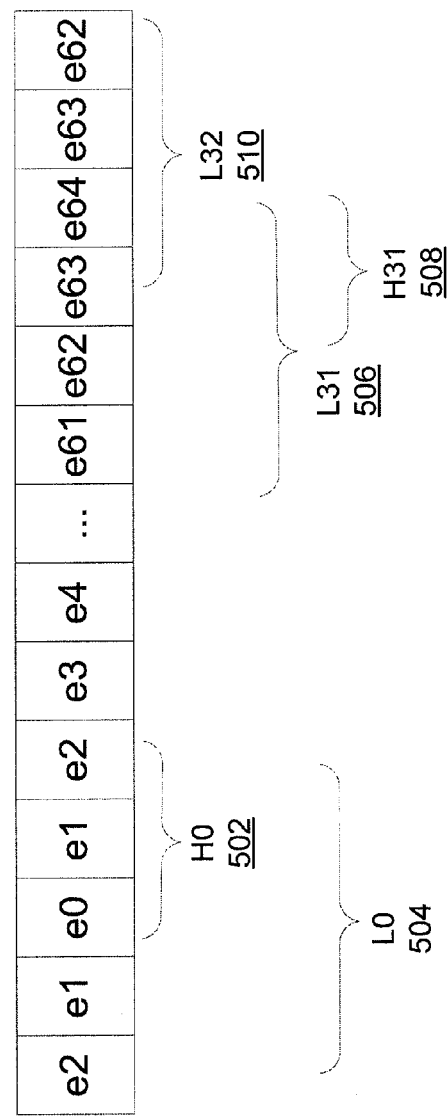
FIG. 5 is diagram illustrating high and low pass filtered coefficients configured for use in systems and methods for reducing tile boundary distortion according to embodiments of the disclosure.

Thus, as can be seen above, upon transforming the mirrored signal including the extrapolated additional data element, a zero value is derived for a high frequency boundary data element of the one-dimensional input signal. Accordingly, the $H_{31}$ element may be dropped (e.g., may not be used as the boundary element), leaving 33 low-frequency results and 31 high frequency results (instead of the 32 low-frequency and 32 high-frequency coefficients typically produced). As shown in FIG. 5, the final coefficients for the first DTW pass may be represented as follows:

$$L_{31} = \text{LowPass}(e60, e61, e62, e63, x64)(506)$$

$$H_{31} = \text{HighPass}(e62, e63, x64) = 0(508)$$

$$L_{32} = \text{LowPass}(e62, e63, x64, e63, e62)(510)$$

As described above, upon extrapolating the additional data element, and using this extrapolated result to derive a value of zero for the last high frequency result, a resultant set of coefficients following the transform operation includes one more low frequency coefficient element than high frequency coefficient elements.

Figure 7:
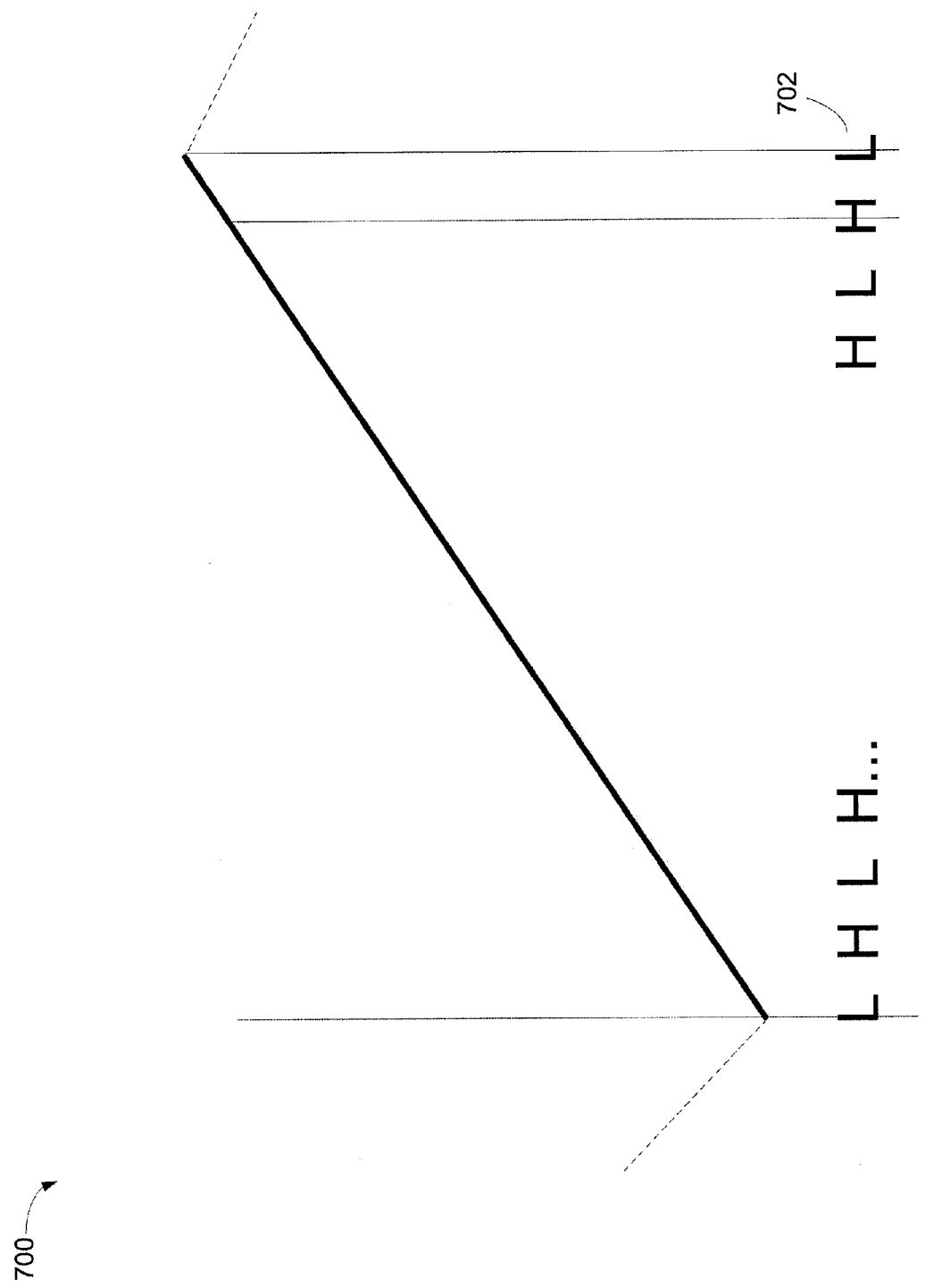
FIG. 7 is graphical representation illustrating a tile boundary after reducing tile boundary distortion according to embodiments of the disclosure.

Accordingly, an additional low frequency element may be produced from the transform and used as a boundary data element to produce mirrored signal boundaries including only low frequency data elements. FIG. 7 is a graphical representation 700 of a tile edge after a transform operation has been performed. Low frequency element 702 becomes the boundary element (e.g., the tile edge frequency element). Mirroring around the additional data element may then provide increased compression capabilities at the tile edge and improving resultant image quality.

From operation 310, the routine 300 may terminate at operation 310 for a given dimension. After a first one-dimensional input signal is processed, a second one-dimensional input signal may be similarly processed. Thus, method 300 may include receiving a second one-dimensional input signal, determining whether the second one-dimensional input signal includes an even number of data elements, if the second one-dimensional input signal includes an even number of data elements, performing a second extrapolation operation on one of a first or second boundary of the second one-dimensional input signal, wherein the second extrapolation operation produces one additional data element, performing a second mirroring operation on the signal data resulting from the second extrapolation operation to produce a second mirrored signal; and performing a second transform operation the second mirrored signal. The above steps may be performed in a similar manner to as described above with respect to steps 302-310.

To further transform received image data, a one-dimensional transformed data signal resulting from the transform operation may be received by transform module 206 (e.g. representing a row or column of transformed image data) and a mirroring operation may be performed on the one-dimensional transformed data signal without extrapolating an additional data element. A first low pass band may further be decomposed to obtain another level of decomposition thereby producing second-level sub-bands: LH2, HL2, HH2, as illustrated in FIGS. 4A and 4B. In some embodiments, a second-pass DWT is performed by the transform module 206, which receives the 33 low-frequency results from the first pass and performs a DWT, producing in turn 17 low-frequency elements and 16 high-frequency elements. There is no artificial high frequency element generated when the number of elements is odd, and thus no need to extrapolate an additional data element. If an even number of low and high frequency elements had been produced, prior to performing a wavelet transformation, the extrapolation and mirroring steps described above would be performed. In the present second-pass example, because the result of a second DTW pass produces an odd number of coefficients, one more low frequency coefficient element than high frequency coefficient element may be produced. Thus, a mirroring operation 312 may be performed on the input signal without extrapolating an additional low frequency coefficient element.

Additional DWT passes may be performed on received one-dimensional transformed data signals resulting from the transform operations as needed. For instance, a second-pass LL sub-band can be further decomposed into third-level sub-bands. FIGS. 4A and 4B further illustrate a DWT tile including 3 exemplary third-level sub-bands: LH1, HL1, and HH1. In some embodiments, a third-pass DWT may performed by the transform module 206, which may receive the 17 low-frequency results and produce (using the same techniques as the previous pass) 9 low-frequency elements and 8 high-frequency elements. Performing a third-pass DWT operation may produce an odd number of input elements for a next transform operation, and may thus further produce one or more third pass low frequency coefficient element. A mirroring operation may then be performed on the third-pass boundary coefficient elements without extrapolating an additional coefficient element.

All or at least a portion of operations 302-310 may repeat until all bands have been transformed in each direction (e.g., all rows and columns of input image data). At each level, operations 302-310 may prevent the introduction of a tiling artifact by ensuring peripheral image data contains only low frequency coefficients (either because the transform produced an odd number of elements or because a value of zero was derived for a high frequency peripheral element using the methods described above).

After the processing steps described above, the transformed data in the form of output signals 208 may also be quantized, encoded, or otherwise processed prior to transmitting the image to a remote client. The wavelet coefficients may be quantized for each sub band. After the quantization, the wavelet coefficients may be subjected to bit-plane encoding in each sub band, wherein the bit-plane encoding is conducted for each encoding unit called a code block starting from the upper bit down to the lower bit. The decoding of a sub-image is made possible because of the structure of the data or samples constituting the coded image and which are organized in blocks, each block constituting a basic unit for the coding of the image. Because of this, it may be possible to access more rapidly the sub-image selected by the user by extracting and decoding only the basic blocks corresponding to this sub-image.

At the remote client, the image bands may be decompressed in a reverse manner to the compression processing described above. By proceeding thus, the restored sub-image processed by the methods described herein may include substantially fewer defects on its edges, which may considerably improve the quality of the sub-image and therefore the final rendered image at the remote computer.

Embodiments above the above described system and method may be implemented as a computer process, a computing system or as an article of manufacture such as a computer program product or computer readable media. The computer program product may be a computer storage media or device readable by a computer system and encoding a computer program of instructions for executing a computer process.

The example systems and methods in FIGS. 1-7 have been described with specific client devices, applications, modules, and interactions that may execute in conjunction with an application program that runs on an operating system on a personal computer. Embodiments are not limited to systems according to these example configurations. Furthermore, specific protocols and/or interfaces may be implemented in a similar manner using the principles described herein.

Figure 8:
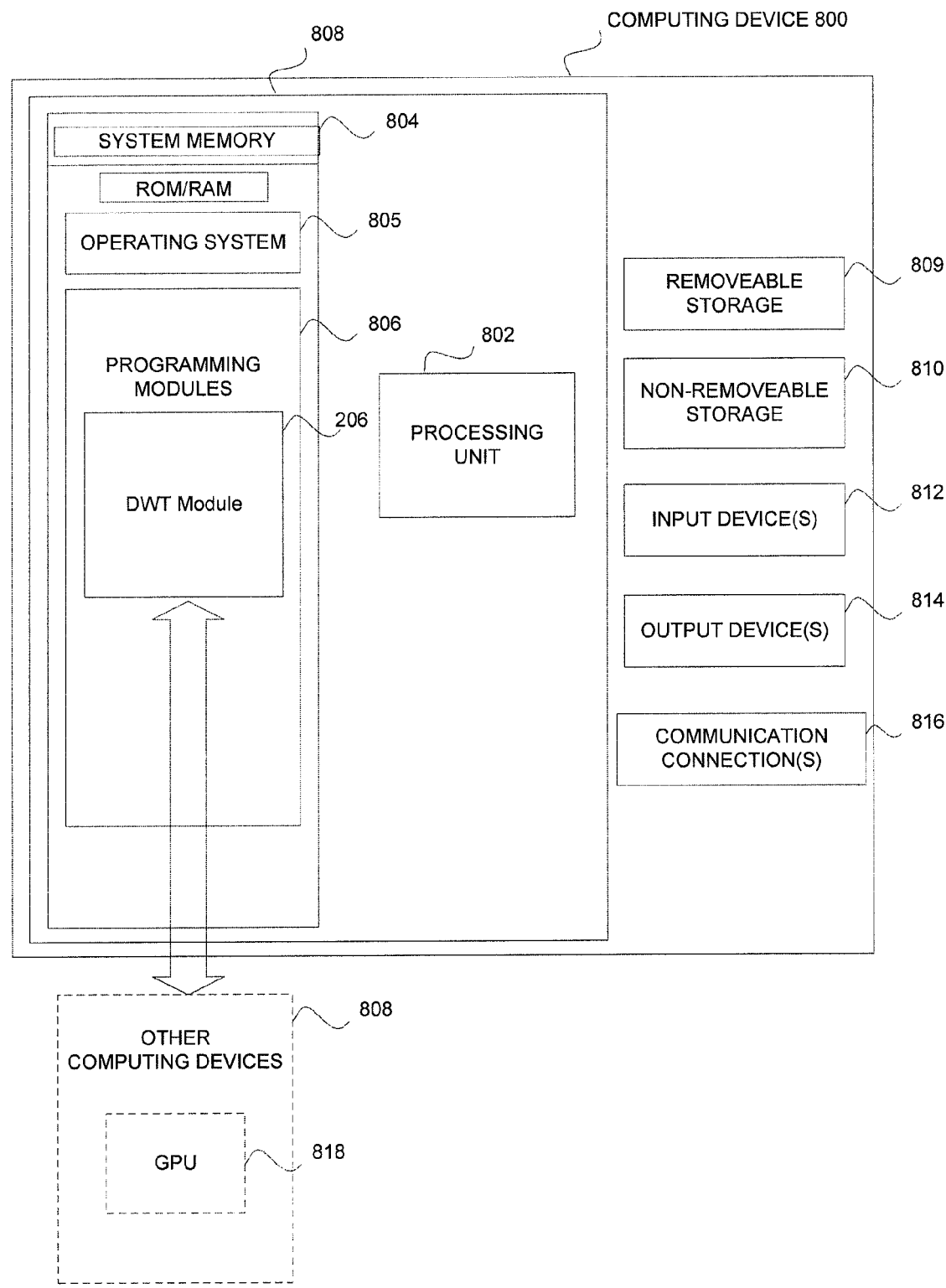
FIG. 8 is a simplified block diagram of a computing system in which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 8 and its associated description provide a discussion of a variety of operating environments in which embodiments may be practiced. However, the devices and systems illustrated and discussed with respect to FIGS. 8-8 are for purposes of example and illustration and are not limiting of a vast number of computing device configurations that may be utilized for practicing embodiments, described herein.

FIG. 8 is a block diagram illustrating example physical components of a computing device 800 with which embodiments may be practiced. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination. System memory 804 may include operating system 805 and one or more programming modules 806. Operating system 805, for example, may be suitable for controlling the operation of computing device 800. Furthermore, embodiments may be practiced in conjunction with a graphics library, other operating systems, or any other application program and is not limited to any particular application or system. This basic configuration is illustrated in FIG. 8 by those components (e.g., graphics processing unit (GPU) 818) within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810.

As stated above, a number of program modules and data files may be stored in system memory 804, including operating system 805. While executing on processing unit 802, programming modules 806 may perform processes including, for example, one or more of the processes described above with reference to FIGS. 1-5. The aforementioned processes are an example, and processing unit 802 may perform other processes. Other programming modules that may be used in accordance with embodiments may include browsers, database applications, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device/system 800 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or tangible computer-readable storage medium. The computer program product may be a computer-readable storage medium readable by a computer system and tangibly encoding a computer program of instructions for executing a computer process. The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, etc. Output device(s) such as a display, speakers, a printer, etc. may also be included. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments herein may be used in connection with mobile computing devices alone or in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

Figure 9A:
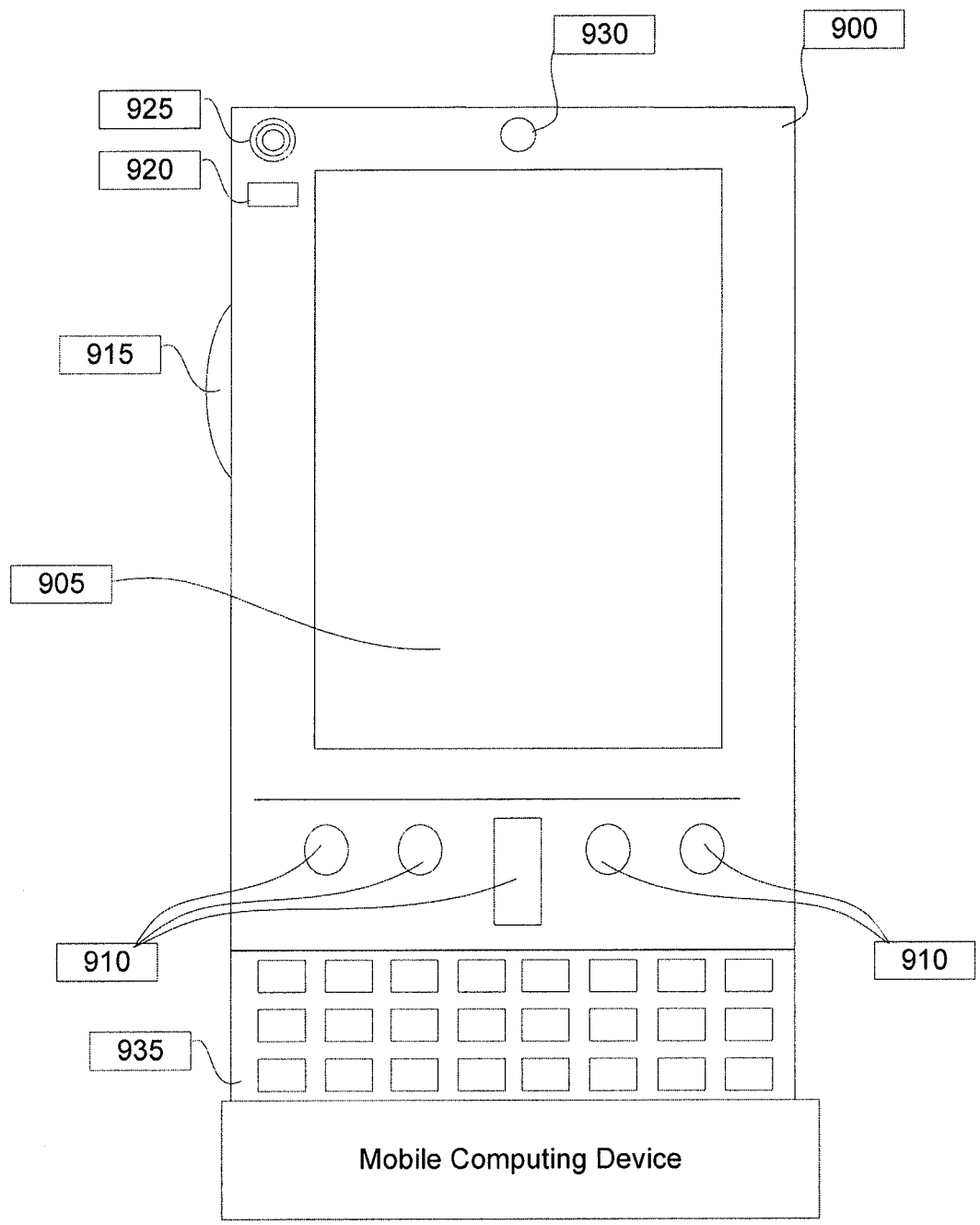
FIG. 9A illustrates one embodiment of a mobile computing device executing one or more embodiments disclosed herein.
Figure 9B:
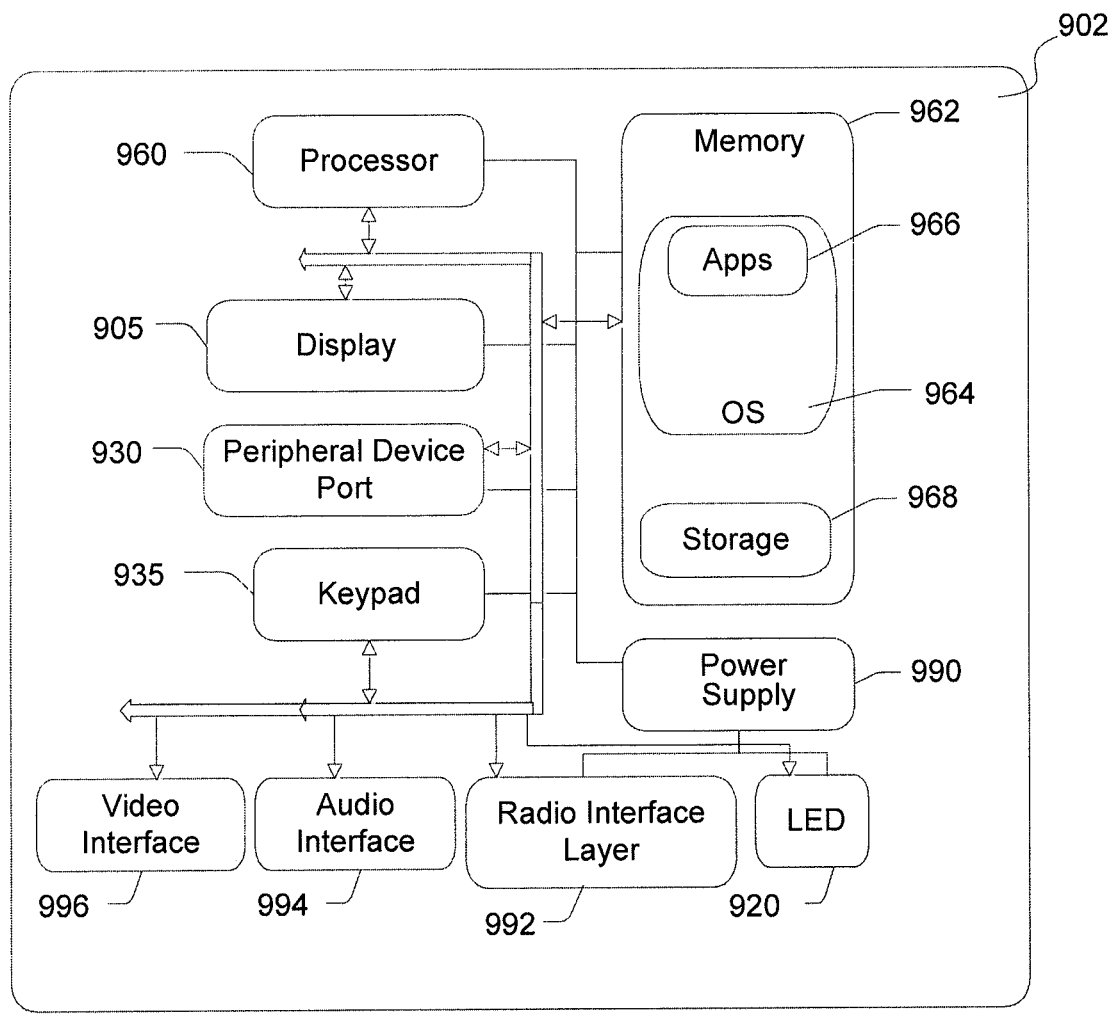
FIG. 9B is a simplified block diagram of an exemplary mobile computing device suitable for practicing one or more embodiments disclosed herein.

FIGS. 9A and 9B illustrate a mobile computing device 900, for example, a mobile telephone, a smart phone, a tablet personal computer, a laptop computer, and the like, with which embodiments of the present disclosure may be practiced. With reference to FIG. 9A, an exemplary mobile computing device 900 for implementing the embodiments is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative embodiments, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some embodiments, the mobile computing device 900 incorporates a vibration transducer for providing the user with tactile feedback. In yet another embodiment, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 900, in alternative embodiments, features of the present disclosure may be used in combination with any number of computer systems, such as desktop environments, laptop or notebook computer systems, multiprocessor systems, micro-processor based or programmable consumer electronics, network PCs, mini computers, main frame computers and the like. Embodiments of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present disclosure.

FIG. 9B is a block diagram illustrating the architecture of one embodiment of a mobile computing device. That is, the mobile computing device 900 can incorporate a system (i.e., an architecture) 902 to implement some embodiments. In one embodiment, the system 902 is implemented as a "smart phone" capable of running one or more applications (e.g., browser, e-mail, calendaring, contact managers, messaging clients, games, and media clients/players). In some embodiments, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world", via a communications carrier or service provider. Transmissions to and from the radio 972 are conducted under control of the operating system 964. In other words, communications received by the radio 972 may be disseminated to the application programs 966 via the operating system 964, and vice versa.

The radio 972 allows the system 902 to communicate with other computing devices, such as over a network. The radio 972 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 902 provides notifications using the visual indicator 920 that can be used to provide visual notifications and/or an audio interface 974 producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968. Computer storage media may include volatile and nonvolatile, removable and non-removable media implemented in any method or technology for storage of information, such as computer readable instructions, data structures, program modules, or other data.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

Figure 10:
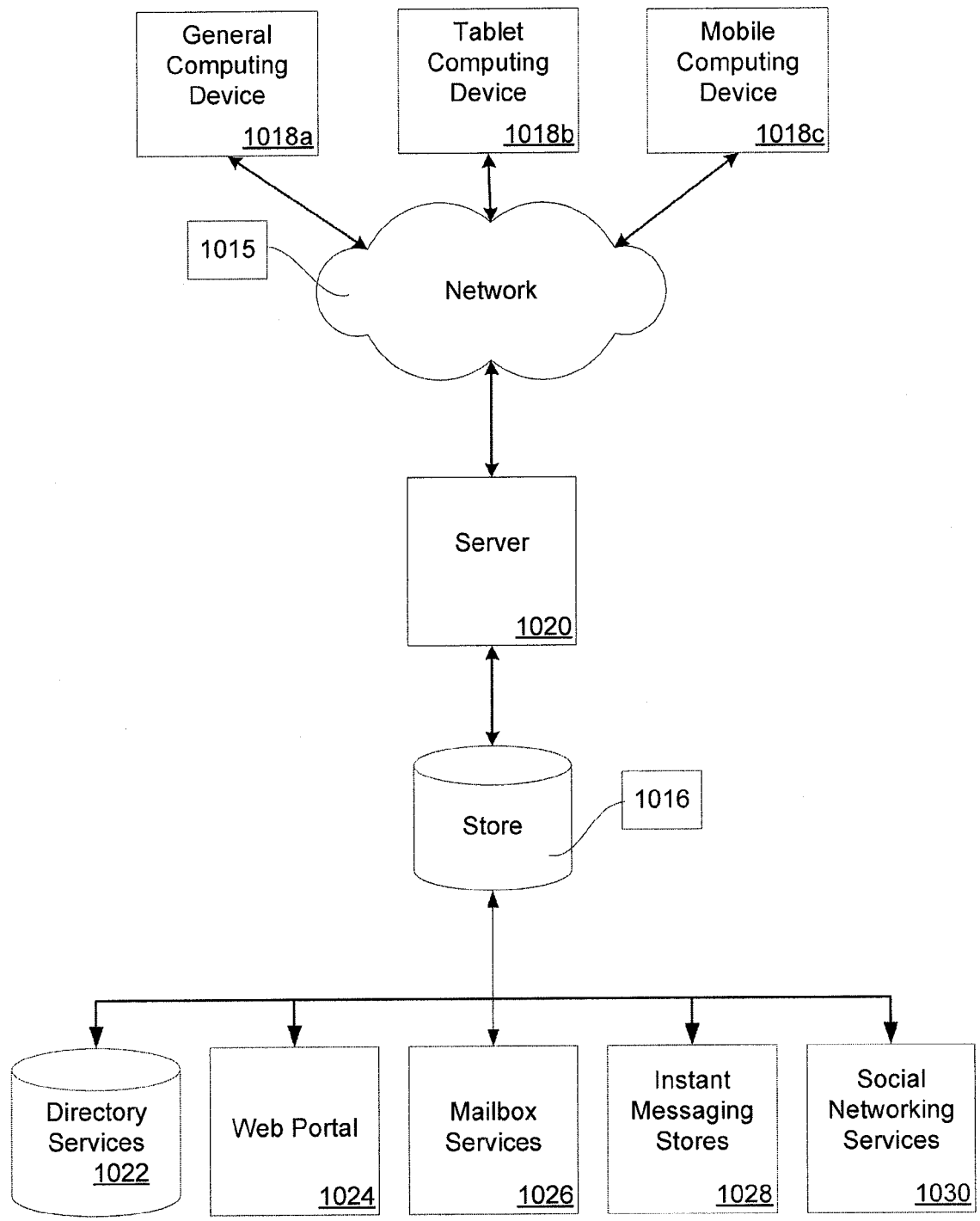
FIG. 10 is a simplified block diagram of an exemplary distributed computing system suitable for practicing one or more embodiments disclosed herein.

FIG. 10 illustrates one embodiment of the architecture of a system for providing converted documents to one or more client devices, as described above. In certain embodiments, the converted documents may be stored in different communication channels or other storage types. For example, various documents, including the converted documents, may be stored using a directory service 1022, a web portal 1024, a mailbox service 1026, an instant messaging store 1028, or a social networking site 1030. The various components of the system 100 use any of these types of systems or the like for enabling data utilization, as described herein. A server 1020 may provide the converted paragraphs to clients. The server 1020 may provide the converted paragraphs and the status updates over the web to clients through a network 1015. By way of example, the client computing device 1018 may be implemented as the computing device 1000 and embodied in a personal computer 1018a, a tablet computing device 1018b and/or a mobile computing device 1018c (e.g., a smart phone). Any of these embodiments of the client computing device 1018 may obtain content from the store 1016. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

It will be apparent to those skilled in the art that various modifications or variations may be made to embodiments without departing from the scope or spirit. Other embodiments are apparent to those skilled in the art from consideration of the specification and practice of the embodiments disclosed herein.

What is claimed:
1. A computer system comprising:
at least one processing unit; and
at least one system memory storing computer-readable instructions that when executed by the at least one processing unit cause the computer system to perform a method for reducing boundary distortion, the method comprising:
receiving a one-dimensional input signal;
determining whether the one-dimensional input signal includes an even number of data elements;
if the one-dimensional input signal includes an even number of data elements, performing an extrapolation operation on one of a first or second boundary of the one-dimensional input signal, wherein the extrapolation operation produces one additional data element;
performing a mirroring operation on the signal data resulting from the extrapolation operation to produce a mirrored signal; and
performing a transform operation on the mirrored signal.

2. The computer system of claim 1, wherein the one-dimensional input signal represents a row or column of input image data.

3. The computer system of claim 2, wherein the transform operation is a discrete wavelet transform configured to produce two additional data signals from the transformed mirrored signal, wherein one of the two additional data signals is a low frequency data signal and one of the two additional data signals is a high frequency data signal.

4. The computer system of claim 3, wherein, upon transforming the mirrored signal including the extrapolated additional data element, a zero value is derived for a high frequency boundary data element of the one-dimensional input signal.

5. The computer system of claim 4, wherein transforming the mirrored signal produces one additional low frequency data element.

6. The computer system of claim 5, further including:
using the additional low frequency data element as a boundary data element to produce mirrored signal boundaries including only low frequency data elements thereby reducing boundary distortion.

7. The computer system of claim 6, further including:
receiving a second one-dimensional input signal;
determining whether the second one-dimensional input signal includes an even number of data elements;
if the second one-dimensional input signal includes an even number of data elements, performing a second extrapolation operation on one of a first or second boundary of the second one-dimensional input signal, wherein the second extrapolation operation produces one additional data element;
performing a second mirroring operation on the signal data resulting from the second extrapolation operation to produce a second mirrored signal; and
performing a second transform operation on the second mirrored signal.

8. The computer system of claim 1, further including:
receiving a one-dimensional transformed data signal resulting from the transform operation;
determining that the received one-dimensional transformed data signal includes an odd number of data elements;
performing a mirroring operation on the received one-dimensional transformed data signal without extrapolating an additional data element; and
performing a second transform operation on the mirrored one-dimensional transformed data signal.

9. A computer-readable medium comprising executable instructions that, when executed by a processor, reduce boundary distortion, the computer-readable medium including instructions executable by the processor for:
receiving a one-dimensional input signal;
determining whether the one-dimensional input signal includes an even number of data elements;
if the one-dimensional input signal includes an even number of data elements, performing an extrapolation operation on one of a first or second boundary of the one-dimensional input signal, wherein the extrapolation operation produces one additional data element;
performing a mirroring operation on the signal data resulting from the extrapolation operation to produce a mirrored signal; and
performing a transform operation on the mirrored signal.

10. The computer-readable medium of claim 9, wherein the one-dimensional input signal represents a row or column of input image data.

11. The computer-readable medium of claim 10, wherein the transform operation is a discrete wavelet transform configured to produce two additional data signals from the transformed mirrored signal, wherein one of the two additional data signals is a low frequency data signal and one of the two additional data signals is a high frequency data signal.

12. The computer-readable medium of claim 11, wherein, upon transforming the mirrored signal including the extrapolated additional data element, a zero value is derived for a high frequency boundary data element of the one-dimensional input signal.

13. The computer-readable medium of claim 12, wherein transforming the mirrored signal produces one additional low frequency data element.

14. The computer-readable medium of claim 13, further including:
    using the additional low frequency data element as a boundary data element to produce mirrored signal boundaries including only low frequency data elements thereby reducing boundary distortion.

15. The computer-readable medium of claim 14, further including:
    receiving a second one-dimensional input signal;
    determining whether the second one-dimensional input signal includes an even number of data elements;
    if the second one-dimensional input signal includes an even number of data elements, performing a second extrapolation operation on one of a first or second boundary of the second one-dimensional input signal, wherein the second extrapolation operation produces one additional data element;
    performing a second mirroring operation on the signal data resulting from the second extrapolation operation to produce a second mirrored signal; and
    performing a second transform operation on the second mirrored signal.

16. The computer-readable medium of claim 9, further including:
    receiving a one-dimensional transformed data signal resulting from the transform operation;
    determining that the received one-dimensional transformed data signal includes an odd number of data elements;
    performing a mirroring operation on the received one-dimensional transformed data signal without extrapolating an additional data element; and
    performing a second transform operation on the mirrored one-dimensional transformed data signal.

17. A method for reducing boundary distortion performed by a computing system having at least one processing unit, the method comprising:
    receiving a one-dimensional input signal, wherein the one-dimensional input signal represents a row or column of input image data;
    determining whether the one-dimensional input signal includes an even number of data elements;
    if the one-dimensional input signal includes an even number of data elements, performing an extrapolation operation on one of a first or second boundary of the one-dimensional input signal, wherein the extrapolation operation produces one additional data element;
    performing, by the computing system, a mirroring operation on the signal data resulting from the extrapolation operation to produce a mirrored signal;
    performing, by the computing system, a transform operation on the mirrored signal, wherein, upon transforming the mirrored signal including the extrapolated additional data element, a zero value is derived for a high frequency boundary data element of the one-dimensional input signal;
    receiving a second one-dimensional input signal, wherein the second one-dimensional input signal represents the other of the row or the column of input image data represented by the first one-dimensional input signal;
    determining whether the second one-dimensional input signal includes an even number of data elements;
    if the second one-dimensional input signal includes an even number of data elements, performing a second extrapolation operation on one of a first or second boundary of the second one-dimensional input signal, wherein the second extrapolation operation produces one additional data element;
    performing, by the computing system, a second mirroring operation on the signal data resulting from the second extrapolation operation to produce a second mirrored signal; and
    performing, by the computing system, a second transform operation on the second mirrored signal.

18. The method of claim 17, wherein the transform operation is a discrete wavelet transform configured to produce two additional data signals from the transformed mirrored signal, wherein one of the two additional data signals is a low frequency data signal and one of the two additional data signals is a high frequency data signal.

19. The method of claim 17, wherein transforming the mirrored signal produces one additional low frequency data element and the additional low frequency data element is used as a boundary data element to produce mirrored signal boundaries including only low frequency data elements thereby reducing boundary distortion.

20. The method of claim 17, receiving a one-dimensional transformed data signal resulting from the transform operation;
    determining that the received one-dimensional transformed data signal includes an odd number of data elements;
    performing a mirroring operation on the received one-dimensional transformed data signal without extrapolating an additional data element; and
    performing a second transform operation on the mirrored one-dimensional transformed data signal.

* * * * *